July 23, 1963          R. G. BUSH          3,098,495

CLEANING SYSTEM FOR EGG BREAKING AND SEPARATING DEVICES

Filed March 6, 1962          2 Sheets-Sheet 1

Inventor
Robert G. Bush
By Schneider, Dressler, Goldsmith & Clement
Attorneys

July 23, 1963 R. G. BUSH 3,098,495
CLEANING SYSTEM FOR EGG BREAKING AND SEPARATING DEVICES
Filed March 6, 1962 2 Sheets-Sheet 2

Inventor
Robert G. Bush
By Schneider, Dressler, Goldsmith & Clement
Attorneys

United States Patent Office 3,098,495
Patented July 23, 1963

3,098,495
CLEANING SYSTEM FOR EGG BREAKING AND SEPARATING DEVICES
Robert G. Bush, Green Bay, Wis., assignor to Leonard Shelton, Omaha, Nebr.
Filed Mar. 6, 1962, Ser. No. 177,895
3 Claims. (Cl. 134—77)

The present invention relates to a cleaning system for egg breaking and separating mechanisms and more particularly to a system for cleaning the egg contacting parts and egg product contacting parts of the device.

Egg breaking and separating machines are difficult to clean efficiently and effectively to remove all egg products from the egg clamping and contacting and egg product handling parts thereof. Various machines which have been commercialized from time to time employ high pressure liquid streams and scrubbing brush mechanisms. These arrangements, however, have not been as effective as is desired. Cleaning arrangements of those types are generally incapable of cleaning crevices or the very thin spaces between contacting parts, etc. Further, egg white and egg yolk products are highly adhesive and extremely difficult to remove from parts of automated equipment. In addition to the highly adhesive character of the egg white and egg yolk products, these products are resilient, which property further increases the difficulty of removing them from the mechanism parts on which they are disposed.

These problems have been overcome by the present invention which utilizes a unique, high intensity ultrasonic energy bath system for such cleaning purposes. While it is recognized that ultrasonic bath cleaning is generally known for removal of surface dirt, oil, and grease, etc., it was found that such systems as those generally employed in other environments were not operative or effective for cleaning egg breaking and separating equipment. By the unique arrangement of close proximity of the ultrasonic transducers employed to each other and to the egg contacting parts and egg product handling parts of the equipment during the cleaning operation, coupled with the uniquely high intensity energy levels employed, cleaning of egg product and egg contacting mechanisms has been effectively and efficiently accomplished so that the mechanism is cleaned not only on the exposed portions thereof, but also in the deep interstices thereof.

The foregoing and other features and advantages and operating characteristics of embodiments of the present invention will become more readily apparent from the following description of the invention and an illustrative embodiment thereof, and from the accompanying drawings in which each and every detail shown is incorporated herein as a part of this specification, in which like reference numerals refer to like parts, and in which.

Figure 1:
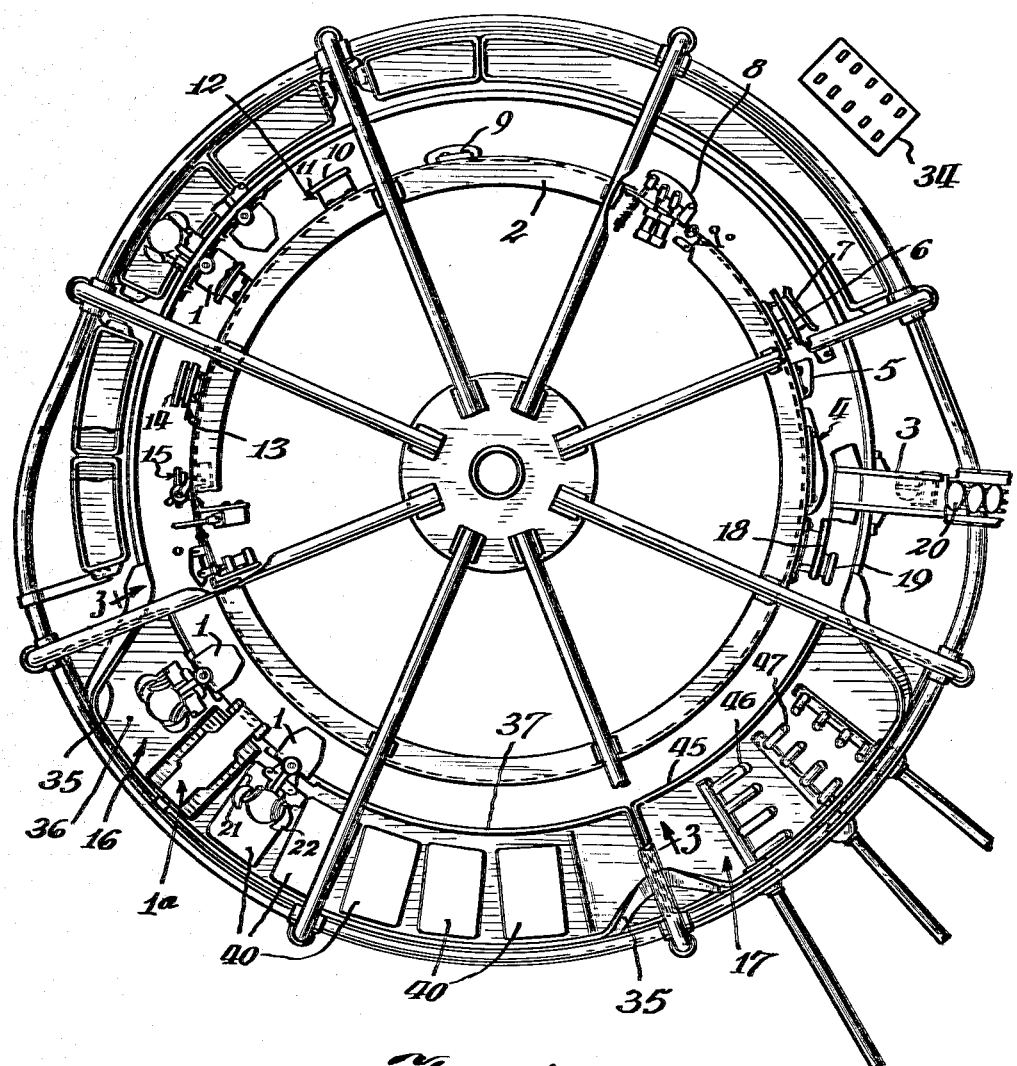
FIGURE 1 is a plan view of an illustrative form of egg breaking and separating mechanism with a cleaning system embodying the present invention incorporated therein.

It should be appreciated that cleaning systems embodying this invention are systems of general utility in the field of cleaning egg handling parts and egg product handling parts of egg breaking and separating mechanisms and that the system described herein is an illustrative embodiment of the invention particularly adapted for the arrangement of the mechanism of FIGURE 1. Other embodiments within the scope of this invention may be arranged for other forms of egg breaking and separating mechanisms.

The illustrative form shown in FIGURE 1 is a rotary type of mechanism wherein a plurality of egg breaking and separating heads 1 are mounted on a carrier ring 2 for rotation and movement past a plurality of operating stations. These stations include an egg feeding station 3 where eggs are fed to the head, an egg clamping station 4, an egg cutting station 5, an egg opening station 6 and resetting station 7, a head coding station 8, a shell dumping station 9, light yolk and dark yolk emptying stations 10 and 11 which are disposed above a good egg white emptying station 12, an inedible yolk station 13 disposed above a mixed egg dumping station 14 and an inedible egg white dumping station 15, a washing station indicated generally at 16, a rinsing and sanitizing station indicated generally at 17, a head closing station 18, and an egg product cup repositioning station 19.

The individual heads 1 in the arrangement shown in FIGURE 1 are cam operated devices. The cams for each of the operating stations, all of which cams are mounted on a central support structure and drum, are the portions which have been indicated by the station numerals. It will be recognized also that the mechanism and the heads may be operated by means other than cams.

Figure 2:
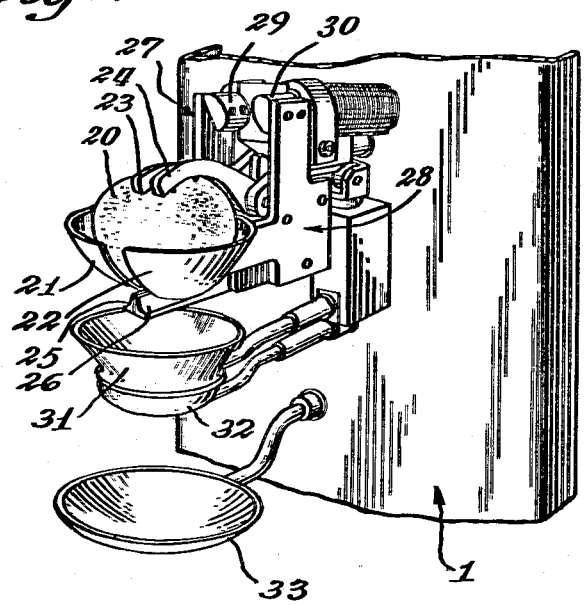
FIGURE 2 is a fragmental perspective view of an egg breaking and separating head of the type utilized with the mechanism of FIGURE 1.
Figure 3:
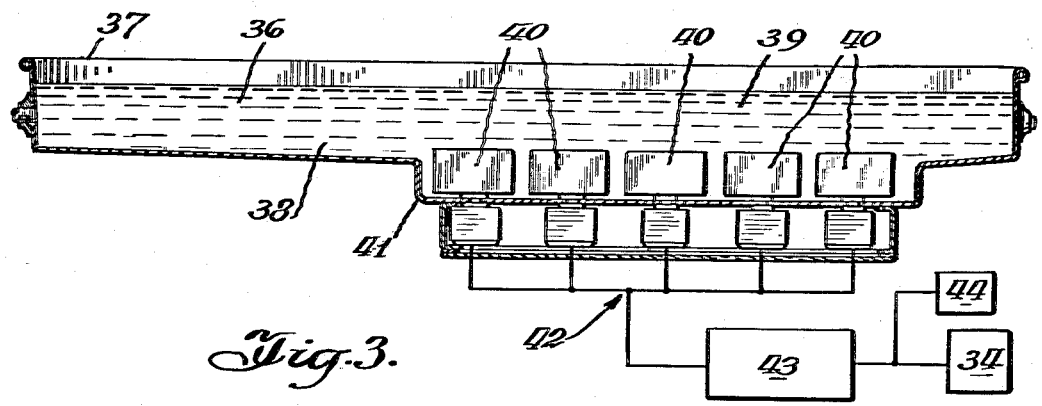
FIGURE 3 is a sectional view of the cleaning pan and transducer system of the machine of FIGURE 1 taken substantially along the line 3—3 of FIGURE 1, but showing the transducer system diagrammatically.

The heads that rotate with the ring 2 are shown generally in the fragmental perspective view of FIGURE 2. These heads are each individually operated and function individually at the aforementioned stations. In their normal operation, an egg 20 is fed into and deposited in a cup comprised of a pair of separable symmetric cup halves 21 and 22 which are cooperatively arranged with a pair of clamping fingers 23 and 24 and a pair of knife halves 25 and 26. These various parts are arranged in sub-assemblies indicated generally at 27 and 28, each of which includes a cup half, a clamping finger, and a knife half.

When an egg is deposited in the cup formed by the cup halves, the fingers are permitted to descend onto the egg to clamp the same firmly in position in the cup halves. While the fingers and cup halves cooperate to hold the egg, the knife halves are actuated to move with a snap action into the under side of the shell of the egg between the cup halves to cut the shell. Then the sub-assemblies are rotationally separated by movement about their axes 29 and 30 so that the contents of the egg flow from the egg shell through a combination funnel and clipper 31 into a yolk cup 32 and a white cup 33 or into a whole egg cup, not shown, which may be readily substituted for either the yolk cup or the white cup. When the egg products are to be separated, the cups 32 and 33 are utilized so that the egg yolk will remain in the yolk cup 32 and the white will run over the edge of the yolk cup 32 and into the white cup 33. The clipper 31 may be oscillated vertically to cut the egg white hanging over the edge of the yolk cup, from the yolk, so that it will run into the white cup.

At this stage of the operation, the inspector or operator of the mechanism determines the character of the egg yolk and egg white or mixed egg products and operates appropriate control buttons on the control panel 34 (FIGURE 1) for actuation of the coding station 8. When the head moves past the coding station, cam operated portions thereof are moved to selected positions so that the various cups will be emptied at an appropriate position as the head moves past the egg product emptying stations 10–15, inclusive.

If inedible egg products were present, the head should be washed, rinsed and sanitized when the emptying of the cups is completed. This prevents the next egg received by the machine from having the products thereof mixed with or contaminated by the inedible products of the previous egg handled thereby.

Also, as a matter of cleanliness and as a public health and safety measure, the egg handling equipment, and particularly the egg and egg product contacting parts of all of the heads should be washed, rinsed, and sanitized periodically. With the mechanism shown in FIGURE 1, these cleansing processes may be effected automatically and without any attending delays or shutdowns of the machine by having either the selected heads or all heads cleaned as they pass the washing station 16 and the rinsing and sanitizing station 17. The operator or inspector at the control station 34 has essentially complete control over such operation excepting that the system can be and preferably is arranged in such a manner that whenever inedible egg products are handled by a head, that head is individually and automatically cleaned before accepting another egg for processing.

As a head which is to be cleaned approaches the cleaning station 16, the head is released from its normal upright position and follows a track 35 so that all of the egg holding and egg product contacting parts shown in FIGURE 2 are lowered into the cleaning fluid bath 36 contained in the cleaning tank 37. A lowered head is shown in FIGURE 1 and indicated generally at 1a.

The tank 37 has two primary operating zones 38 and 39 which are a precleaning zone and an intense cleaning zone, respectively. The head is lowered into the precleaning zone 38 so that egg products and parts such as shell fragments thereon are given a short presoaking during the time interval between the lowering of the head into the cleaning solution 36 and the arrival thereof at the intense cleaning zone 39. The intense cleaning zone is equipped with a plurality of ultrasonic generators or transducer devices such as, by way of example and not by way of limitation, Sonogen Ultrasonic Transducers, available from Branson Instruments, Inc., of Stamford, Connecticut. That particular ultrasonic generator or transducer, however, is not critical to the invention.

It is important that the generators have an aggregate output energy level which, when they are in reasonably close proximity to each other, is sufficiently intense to exceed the energy absorbed by the egg products and parts adhered to the egg handling and egg product contacting elements of the breaking and separating device.

In the particular embodiment shown in the drawings, the transducers 40 are set in a well 41 in the bottom of the cleaning tank 37 at the exit end thereof so that the egg and egg product contacting elements of the head 1 will pass immediately thereover and immediately adjacent thereto in the high intensity cleansing zone 39. The transducers are connected through appropriate circuitry indicated generally at 42 to a generator 43 which is controlled either from the control station 34 or other special control arrangements indicated generally at 44 so that the transducers may be energized only when a head is in the cleaning tank 37. This arrangement is preferable in order to extend the life of the transducers, but they may be operated in any other effective fashion.

An exemplary transducer system operative in accordance with this invention is one in which all of the transducers employed are disposed as closely adjacent to each other as may be convenient mechanically, or so that the highest intensity which may be generated thereby may be employed substantially uniformly over the full length of an elongated cleaning path. In one such arrangement, five transducers each operate at a level of 200 watts input and at a frequency range of from about 20,000 cycles per second to about 40,000 cycles per second has been found to be highly effective.

An arrangement using intensity levels per transducer of about 100 watts, but utilizing ten transducers in the bath for a total of 1,000 watts was found to be ineffective. Thus, it was a surprising result when it was found that the same energy level, but of a higher intensity per unit with the total energy in a more concentrated arrangement was found to be effective.

When the head to be cleaned reaches the end of the high intensity cleansing zone 39, it is lifted out of the bath 36 as it follows the track 35 and is then lowered into the pan 45 of the rinsing and sanitizing station 17. There, the head passes a series of spraying and blowing elements 46 and 47. As the head passes the spraying and blowing elements, it is successively rinsed and sanitized and blown dry.

Following the rinsing and sanitizing, the head is raised by the track 35 and locked into its vertical position for recycling.

It will be appreciated that numerous variations and modifications may be effected, and systems may be made bearing little resemblance to the illustrative arrangement shown and described herein, all without departing from the true spirit and scope of the novel concepts and principles of this invention.

I claim:

1. In an egg breaking and separating machine having egg breaking and separating heads with an egg contacting and egg product handling element thereon, a cleaning system to remove egg parts and egg products from the egg contacting and egg product handling elements, said cleaning system including a tank to contain a cleaning bath and a well in the bottom of the tank adjacent to one end thereof, a plurality of closely adjacently disposed ultrasonic energy generators in said well immediately adjacent to a path of movement of said egg contacting and egg product handling elements when said elements travel through said bath, and means to energize said generators to an energy level sufficient to create a condition in the bath in the tank whereby egg parts and egg products are removed from said elements.

2. In an egg breaking and separating machine having egg breaking and separating heads with an egg contacting and egg product handling element thereon, a cleaning system to remove egg parts and egg products from the egg contacting and egg product handling elements, said cleaning system including a tang containing a cleaning bath and defining a well portion adjacent one end thereof, a plurality of closely adjacently disposed ultrasonic energy generators in said well immediately adjacent to a path of movement of said egg contacting and egg product handling elements when said elements travel through said bath, means to energize said generators to an energy level sufficient to create a condition in the bath in the tank whereby egg parts and egg products are removed from said elements, means to rinse said egg contacting and egg product handling elements, and means to sanitize same.

3. In an egg breaking machine having egg contacting and holding elements and egg product handling elements thereon, a cleaning system to remove egg parts and egg products from said elements, said system including a tank adapted to contain a cleaning bath, said tank defining a well portion adjacent one end thereof, an ultrasonic energy generator coupled to said tank and disposed in said well to activate a bath in said tank with ultrasonic wave energy at an intesity to remove egg parts and egg products from said elements at least when said elements are in a bath in said tank and adjacent to said transducer, means to rinse and sanitize the egg contacting and holding elements of the egg product handling elements, said means to rinse and sanitize said egg contacting and holding elements and said egg product handling elements including spraying means to direct rinsing and sanitizing fluids at said elements.

References Cited in the file of this patent

UNITED STATES PATENTS

| | | |
|---|---|---|
| 869,333 | Shaw | Oct. 29, 1907 |
| 1,475,535 | Bonine | Nov. 27, 1923 |
| 2,831,785 | Kearney | Apr. 22, 1958 |
| 2,981,268 | McAuley | Apr. 25, 1961 |
| 3,033,710 | Hightower | May 8, 1962 |
| 3,066,084 | Osterman | Nov. 27, 1962 |

FOREIGN PATENTS

| | | |
|---|---|---|
| 1,088,781 | Germany | Sept. 8, 1960 |